US012092372B2

(12) United States Patent
Brottier et al.

(10) Patent No.: US 12,092,372 B2
(45) Date of Patent: Sep. 17, 2024

(54) INSTALLATION COMPRISING A CONNECTOR FOR THE FLUID CONNECTION OF A HEAT EXCHANGER OF AT LEAST ONE HYBRID SOLAR PANEL

(71) Applicant: DUALSUN, Marseilles (FR)

(72) Inventors: Laetitia Brottier, Chazelles (FR); Jérôme Mouterde, Marseilles (FR)

(73) Assignee: DUALSUN, Marseilles (FR)

( * ) Notice: Subject to any disclaimer, the term of this patent is extended or adjusted under 35 U.S.C. 154(b) by 0 days.

(21) Appl. No.: 17/768,020

(22) PCT Filed: Oct. 16, 2020

(86) PCT No.: PCT/FR2020/051861
§ 371 (c)(1),
(2) Date: Apr. 11, 2022

(87) PCT Pub. No.: WO2021/074549
PCT Pub. Date: Apr. 22, 2021

(65) Prior Publication Data
US 2024/0093914 A1 Mar. 21, 2024

(30) Foreign Application Priority Data
Oct. 17, 2019 (FR) ........................................ 1911629

(51) Int. Cl.
*F24S 80/30* (2018.01)
*F24S 10/70* (2018.01)
(Continued)

(52) U.S. Cl.
CPC ............... *F24S 80/30* (2018.05); *F24S 10/70* (2018.05); *H02S 40/425* (2014.12); *H02S 40/44* (2014.12)

(58) Field of Classification Search
CPC .................................. F24S 80/30; F24S 10/70
(Continued)

(56) References Cited

U.S. PATENT DOCUMENTS

| 4,150,720 A | * | 4/1979 | Brackman | ............. | F24S 10/502 |
| | | | | | 165/170 |
| 4,368,726 A | * | 1/1983 | Ellsworth | ............... | F24S 80/60 |
| | | | | | 126/667 |

(Continued)

FOREIGN PATENT DOCUMENTS

| EP | 0964212 A2 | 12/1999 |
| EP | 1788321 A2 | 5/2007 |

(Continued)

OTHER PUBLICATIONS

International Search Report (with English Translation) and Written Opinion (with Machine Translation) issued on Dec. 10, 2020 in corresponding International Patent Application No. PCT/FR2020/051861; 18 pages.

*Primary Examiner* — Steve S Tanenbaum
(74) *Attorney, Agent, or Firm* — Maier & Maier, PLLC

(57) ABSTRACT

An installation including a pipe supplying or discharging a cooling fluid, at least one hybrid solar panel, the panel including: a photovoltaic module, a heat exchanger in which a cooling fluid flows, and a connector connecting the heat exchanger to the pipe. The connector includes a tubular body around the pipe, a tube on an external wall of the tubular body, which provides fluid communication between the pipe and the heat exchanger, the tube and external wall form a single piece, the heat exchanger has a wall in which a hole is made, wherein the tube fits freely into the hole, the tube has a seal that makes the connection between the tube and hole sealed to fluids, the tubular body is assembled by elastic fitting on the heat exchanger which fitting is carried out by means of members which are separate from the hole and fit the tube.

15 Claims, 13 Drawing Sheets

(51) Int. Cl.
*H02S 40/42* (2014.01)
*H02S 40/44* (2014.01)

(58) Field of Classification Search
USPC .......................................... 165/178
See application file for complete search history.

(56) References Cited

U.S. PATENT DOCUMENTS

| | | | |
|---|---|---|---|
| 10,208,879 B2 * | 2/2019 | Hunt | ............... F28F 21/084 |
| 2006/0219239 A1 * | 10/2006 | Plaschkes | ............ F24S 80/30 |
| | | | 126/651 |
| 2011/0192393 A1 | 8/2011 | Swift et al. | |

FOREIGN PATENT DOCUMENTS

| | | | |
|---|---|---|---|
| EP | 2195584 A1 | | 6/2010 |
| EP | 2310733 A2 | | 4/2011 |
| EP | 2397739 A1 | | 12/2011 |
| EP | 2420714 A2 | | 2/2012 |
| EP | 2444704 B1 | | 7/2013 |
| FR | 2244117 A1 | | 4/1975 |
| JP | 2014115065 A | * | 6/2014 |
| WO | 2012069750 A3 | | 5/2012 |
| WO | 2016156764 A1 | | 10/2016 |
| WO | 2016199408 A1 | | 12/2016 |
| WO | 2017162993 A1 | | 9/2017 |
| WO | 2019110884 A1 | | 6/2019 |

* cited by examiner

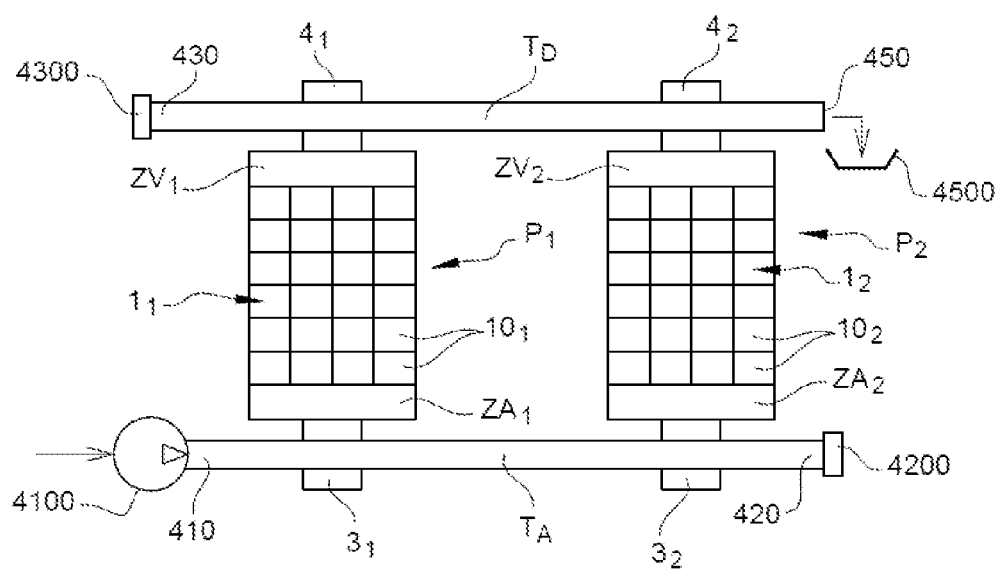
[Fig. 1]

[Fig. 2]
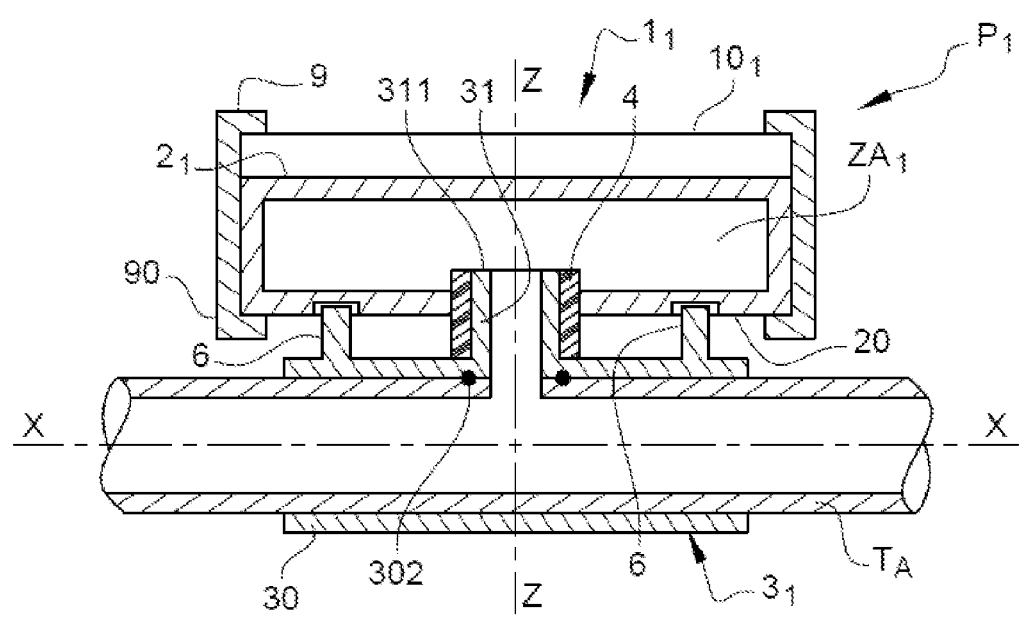

[Fig. 3]
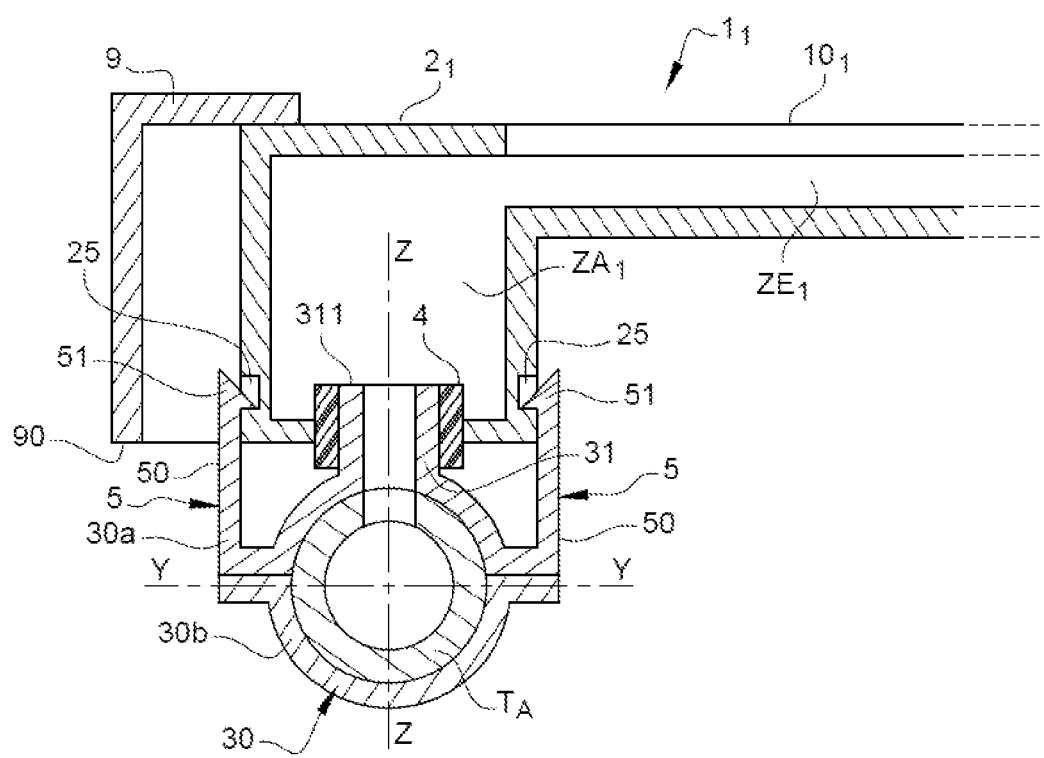

[Fig.4]
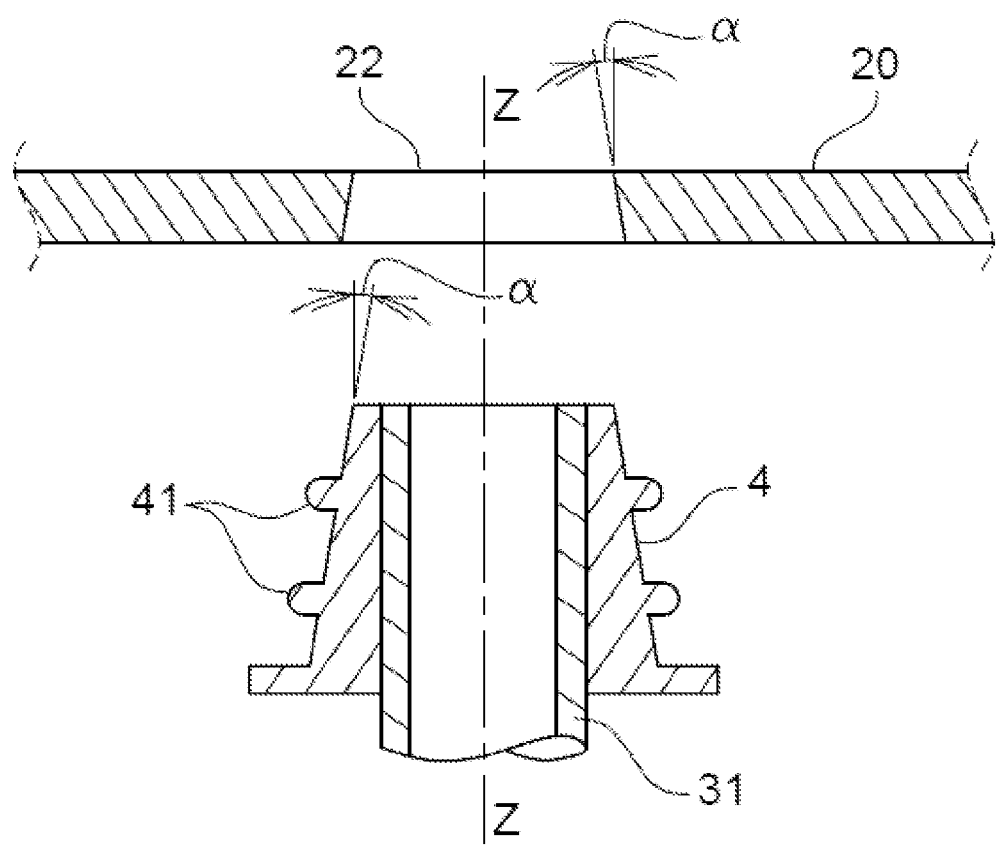

[Fig.5]
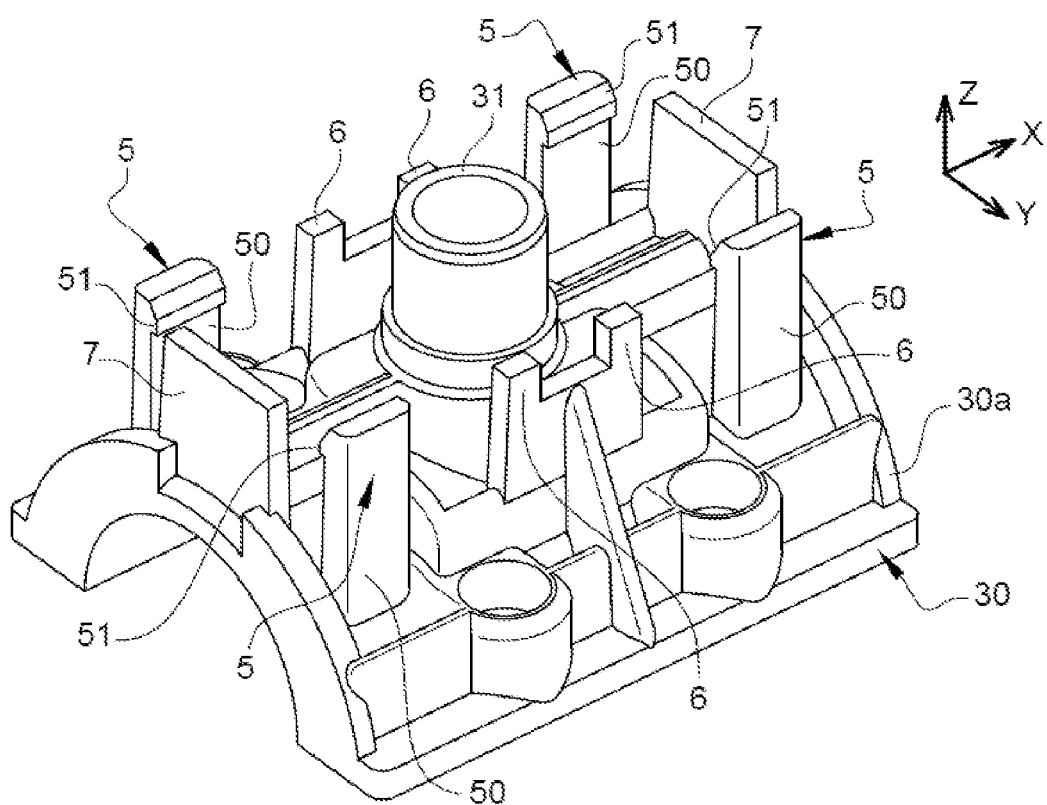

[Fig.6]
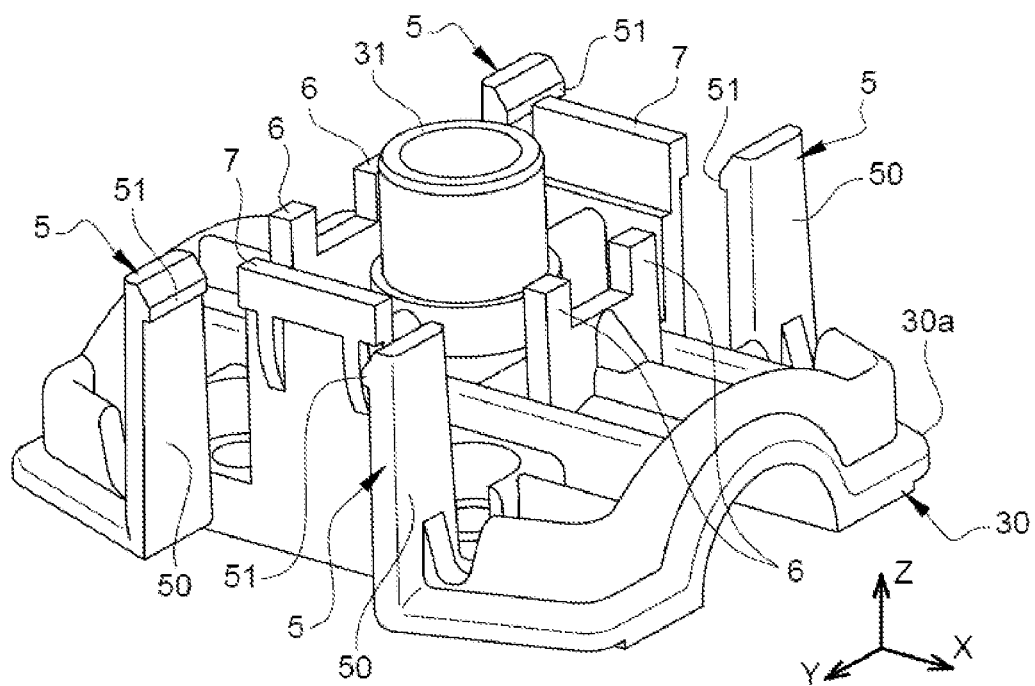

[Fig.7]
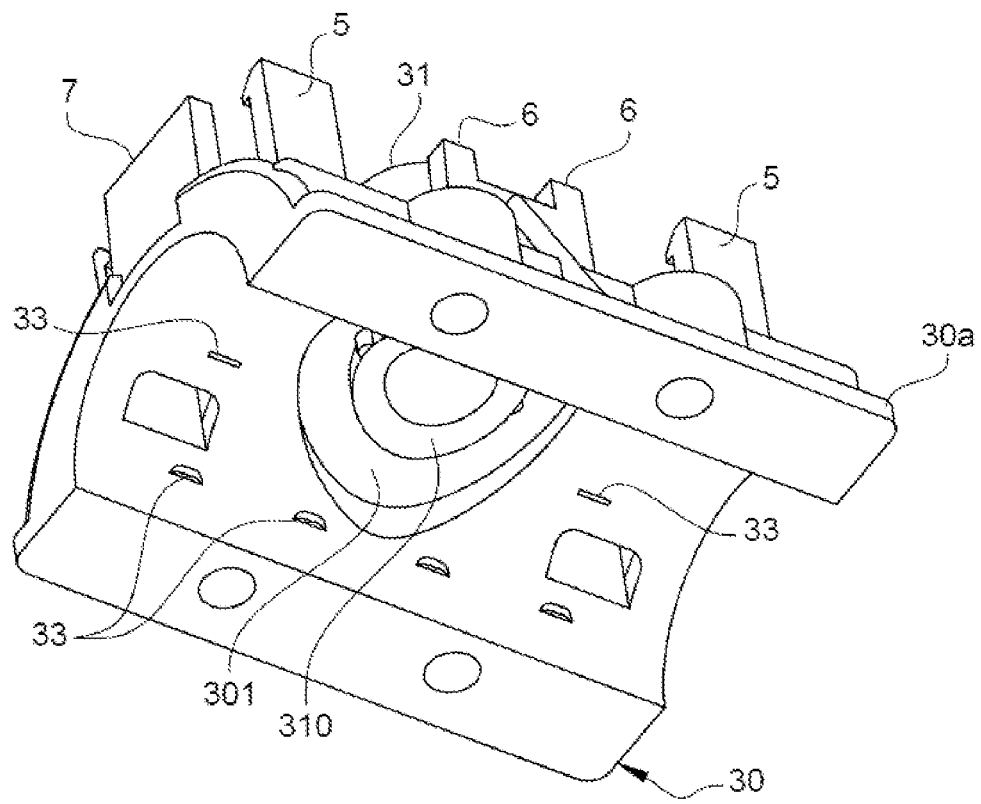

[Fig.8]
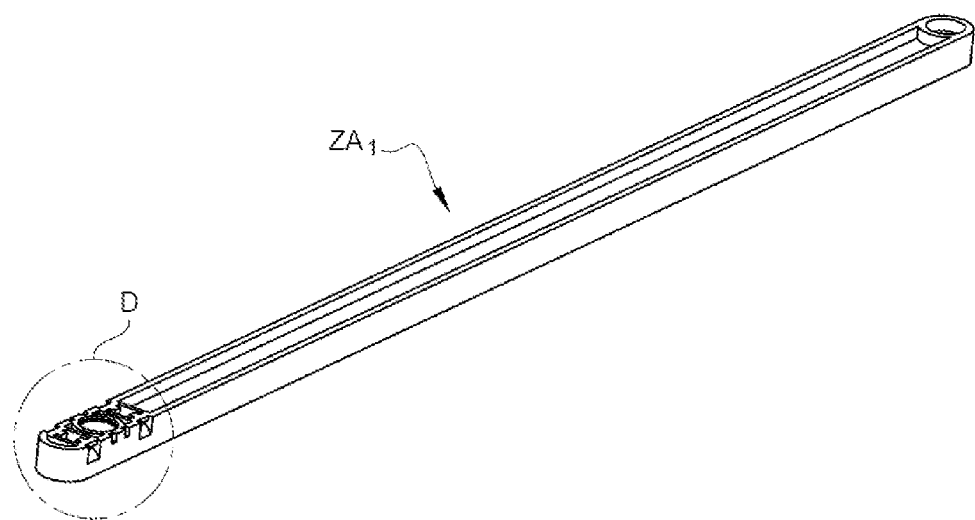

[Fig.9]
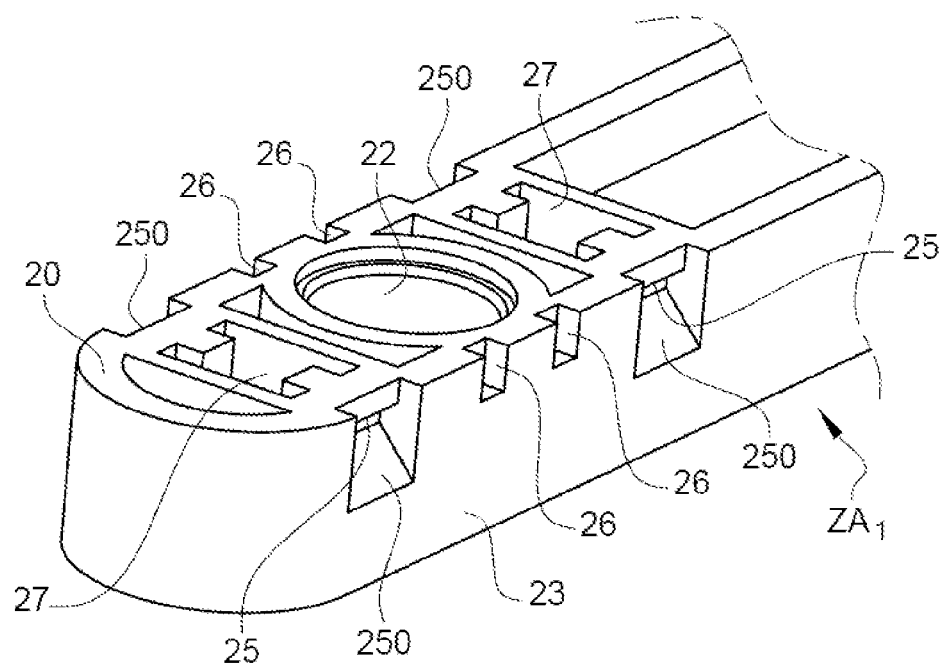

[Fig.10]
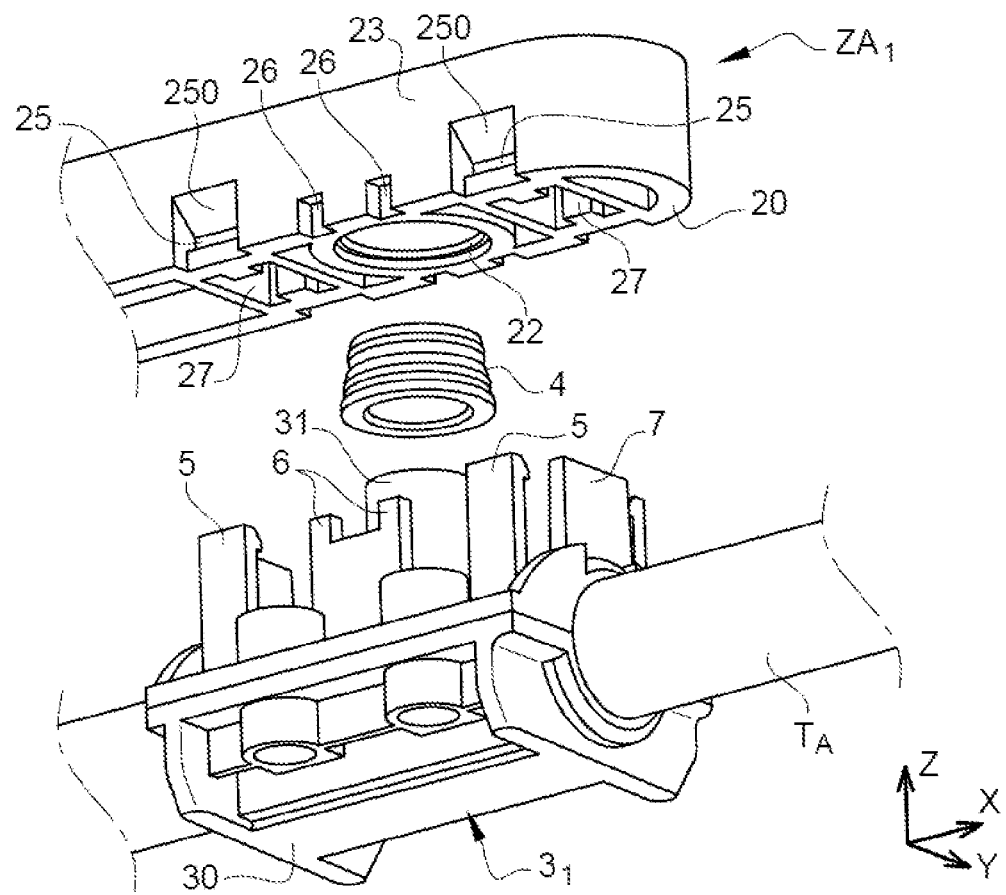

[Fig.11]
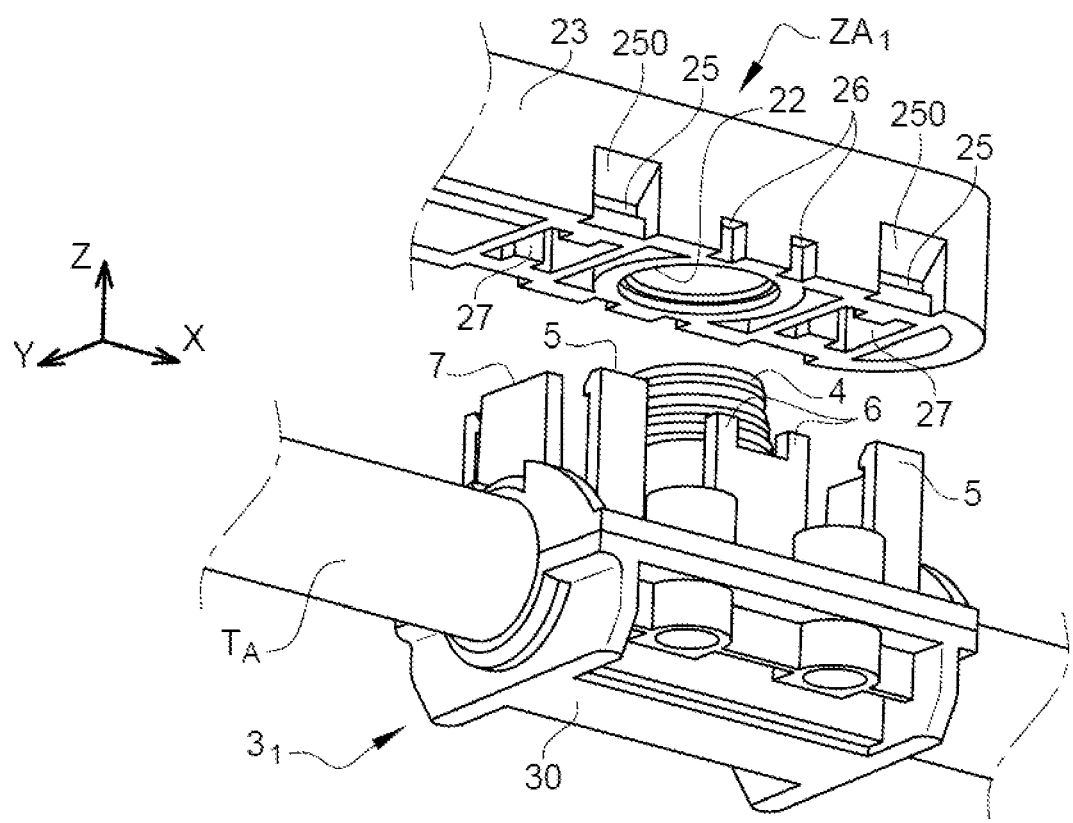

[Fig.12]
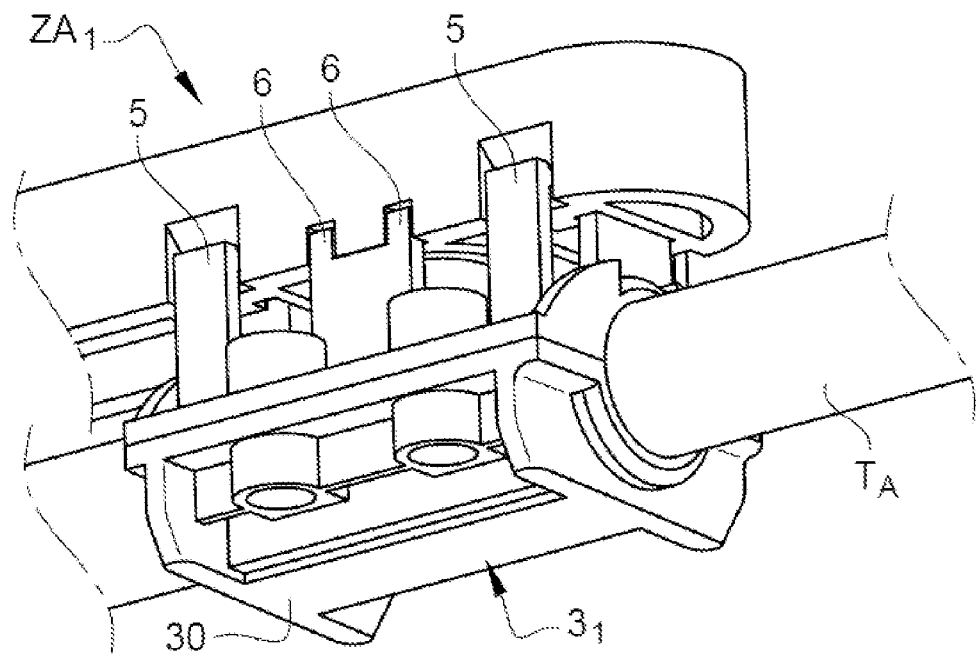

[Fig.13]
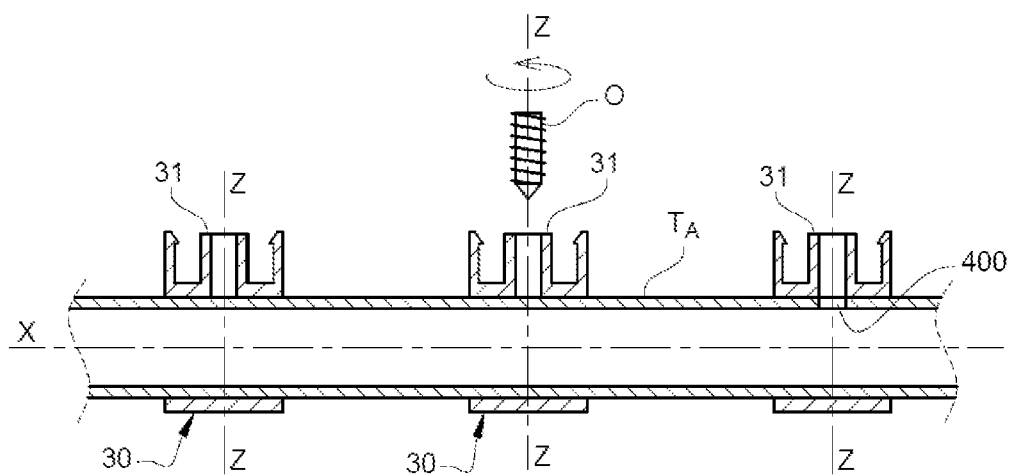

INSTALLATION COMPRISING A CONNECTOR FOR THE FLUID CONNECTION OF A HEAT EXCHANGER OF AT LEAST ONE HYBRID SOLAR PANEL

FIELD

The invention relates to an installation comprising a connector for the fluid connection of a heat exchanger of at least one hybrid solar panel.

It relates to the technical area of fittings for hybrid solar panels.

Background

Photovoltaic solar panels produce electrical energy from sunlight. They comprise several photovoltaic elements (cells or thin film) which operate according to the principle of the photoelectric effect. In general, several photovoltaic elements are connected to each other on a photovoltaic solar panel, and several panels are connected to create a solar installation. The installation generates electricity that can be consumed on site or fed into a distribution grid.

Photovoltaic solar panels convert only a small part of sunlight into electricity, and the rest is unused heat. Such heat has an adverse effect on the electrical efficiency of solar panels, since a temperature-related drop in the efficiency of photovoltaic elements of about −0.45%/° C. can be observed. This is why it is doubly useful to cool photovoltaic solar panels. In fact, not only does that heighten the efficiency of the photovoltaic elements, but the calories obtained from cooling can additionally be used in heating systems of variable complexity. Such panels are called hybrid solar panels, which simultaneously generate electricity and produce heat.

Patent documents WO 2012/069750 (SOLAIRE 2G), WO 2016/156764 (SOLAIRE 2G) and WO 2017/162993 (SOLAIRE 2G) describe hybrid solar panels in which a heat exchanger is arranged opposite the rear surface of the photovoltaic module. Cooling fluid circulates in the exchanger to pick up the calories and cool the photovoltaic module. Connectors, which may be integrated into or added to exchanger manifolds, make it possible to connect the exchanger to a cooling fluid supply or discharge circuit.

When two hybrid solar panels are placed next to each other, their respective heat exchangers are connected to a cooling fluid supply pipe and to a pipe that discharges said fluid, by means of suitable connectors of the type with welded fittings, ringed fittings, threaded fittings, or also compression fittings. The following patent documents disclose examples of such connectors: WO2016199408 (SHARP) EP2444704 (ROTH), EP2397739 (TIEMME RACCORDERIE), EP2420714 (WITZENMANN), EP2310733 (FAKRO), EP2195584 (SENIOR BERGHOEFER), EP1788321 (BOSCH), EP0964212 (FAFCO).

The connectors described in these patent documents are relatively complex to implement and expensive. In addition, due to the very design of the fittings, significant pressure losses are observed, particular due to a multitude of bends in the pipes supplying or discharging cooling fluid. Further, the size of the connectors can be relatively large, which makes them difficult to install, in particular on the sides of panels, because the distance between two adjacent panels is generally less than or equal at 20 mm in hybrid solar panel installations. Their relatively large size is also problematic because in a conventional photovoltaic installation, the distance between the panels and their substrate (for example a roof) is generally small.

Patent document WO 2019/110884 (DUALSUN) describes a connector comprising a tubular body installed around a pipe in which the coolant flows, and a tube installed on an external surface of said tubular body, which provides fluid communication between said pipe and the heat exchanger of the panel. This tube comprises a distal portion which is engaged with the wall of the pipe so as to block the axial rotation and axial displacement of said pipe relative to the tubular body. The proximal portion of the tube is inserted in a sealed and removable manner into a quick action coupling installed at an inlet and/or outlet area of the heat exchanger. Such a plug and play solution allows very fast assembly. The tubular body is further locked in position relative to the heat exchanger by means of one or more locking elements engaged with the wall of the exchanger.

In practice, a bottom wall of the exchanger has a tubular portion in which the quick action coupling is installed. This tubular portion and the quick action coupling are located in the inlet and/or outlet area of the exchanger. This tubular portion protrudes from the external wall of the exchanger without going past the frame of the panel. In practice, such non-protrusion is verified when the height of the frame is relatively high, in particular approximately 45 mm, as that height makes it possible to absorb the length of the tubular portion.

As a result of the trend of optimising the compactness of panels, new frames now have smaller heights, in particular below 45 mm, and may even be equal to or smaller than 30 mm. The connector described in patent document WO 2019/110884 is not suitable for these new frames, because the tubular portion in which the quick action coupling is fitted would protrude outside the frame. Indeed, in a conventional photovoltaic installation, the distance between the panels and their support (for example rails fixed to a roof) is generally small. If the tubular portion protrudes out of the frame, that therefore makes it impossible to install the panel on its support without a complex mounting solution. In addition, protrusion leads to packaging difficulties, as the panels cannot be stacked face to face. There too, there is a need for more complex and more cumbersome packaging solutions.

Furthermore, when the proximal portion of the tube is inserted into the quick action connector, its end enters the heat exchanger. To limit pressure losses inside the exchanger, this end must not be "stuck" to the upper wall of the exchanger, but on the contrary sufficiently spaced from it so that the fluid can flow as freely as possible out of or into the tube. In practice, that constraint requires the use of relatively high exchangers, increasing their protrusion outside new frames.

The applicant has also found that, in use, the connector described in patent document WO 2019/110884 could tend to leak. That sealing problem appears in particular when the proximal portion of the tube is not correctly positioned in the quick action coupling. In practice, such incorrect positioning may be because the connector is not held in place effectively and/or firmly enough, in view of the mechanical stresses to which it is subjected.

The invention aims to overcome the aforementioned technical problems. Another goal of the invention is to provide a quick-mount connector, designed so as to not cause a wall of the heat exchanger to protrude outside the frame, even when said frame has a small height.

A subsidiary goal of the invention is to provide a connector with improved sealing compared to the aforementioned connectors of the prior art.

Another subsidiary goal of the invention is to provide a connector with a design that is simple, robust and easy to install.

SUMMARY

The solution proposed by the invention is an installation comprising: —a pipe to supply or discharge cooling fluid, —at least one hybrid solar panel, wherein said panel comprises:
- a photovoltaic module,
- a heat exchanger in which a cooling fluid flows,
- a connector connecting the heat exchanger to the pipe, wherein said connector comprises:
- a tubular body installed around the pipe,
- a tube installed on an external wall of the tubular body, which provides fluid communication between the pipe and the heat exchanger, which tube and which external wall form a single piece,
- the heat exchanger has a wall in which a hole is made, wherein the tube fits freely in said hole and said tube and/or said hole are devoid of fasteners that hold them in position,
- the tube has a seal that makes the connection between said tube and hole sealed to fluids,
- the seal takes the form of a sleeve that fits onto the external wall of the tube,
- the tubular body is assembled on the heat exchanger by means of members configured to elastically fit said body on said exchanger, which members are separate from the sleeve, the tube and the hole, and which hold said body in place on said exchanger.

The tube is no longer inserted in a quick action coupling, as described in patent document WO 2019/110884, but into a simple hole made in a wall of the exchanger. The external wall of the exchanger can thus be flat, without having to provide a tubular portion in which to house a quick action coupling. The exchanger is in fact particularly compact, with a reduced height compared to that of the exchanger of patent document WO 2019/110884. This exchanger does not protrude out of the frame of the panel, even when said frame has a smaller height. In addition, in the connector according to the invention, the sealing function is separated from the function of holding in place. Sealing between the connector and the exchanger is merely achieve by the cooperation of the seal with the hole of said exchanger. For its part, holding in position is achieved by a separate elastic fitting. This separation of the functions makes it possible to obtain a robust and compact connector, which achieves optimum sealing with the exchanger, even when the cooling fluid is under pressure and/or when said connector is under mechanical stress. Further, this solution, which is particularly easy to implement, allows very simple and very fast installation of the connector.

Other advantageous features of the invention are listed below. Each of these characteristics may be considered alone or in combination with the remarkable characteristics defined above, and be the subject, where applicable, of one or more divisional patent applications:

According to one embodiment: elastic fitting is carried out by means of snap-on members provided on the tubular body, which snap-on members cooperate with complementary snap-on members provided on the heat exchanger.

According to one embodiment: —the snap-on members of the tubular body take the form of flexible tabs which extend, from the external surface of said body, parallel to the tube and on the same side as said tube; —each tab comprises an end integral with the tubular body and a free end fitted with a snap-on element; —Each snap-on element cooperates with a snapping-on hole made on the heat exchanger.

According to one embodiment: the tubular body has two pairs of tabs, wherein the tabs in each pair are arranged in a mirror configuration, symmetrically with respect to the median plane of said body.

According to one alternative embodiment: the tubular body has two pairs of tabs, wherein the tabs in each pair are arranged in a mirror configuration, symmetrically with respect to the secant plane of said body.

According to one embodiment: each snapping-on hole is arranged in a channel made in a wall of the heat exchanger, which channels form guides for the tabs while fitting the tubular body on the wall of said exchanger.

According to one embodiment: one or more lugs are provided on the tubular body, which lugs fit into complementary recesses provided on the exchanger, which lugs are separate from the snap-on members.

According to one embodiment: one or more ribs are provided on the tubular body, which ribs fit into complementary recesses provided on the exchanger, which ribs are separate from the snap-on members.

According to one embodiment: the ribs are arranged symmetrically with respect to the secant plane of the tubular body.

According to one alternative embodiment: the ribs are arranged symmetrically with respect to the median plane of the tubular body.

According to one embodiment: claws or pins are provided on the internal wall of the tubular body.

According to one embodiment: —the sleeve has a tapered external wall; —the hole has the same taper as the sleeve, wherein the internal wall of said hole is adjusted for the external wall of said sleeve.

According to one embodiment: the external wall of the sleeve is provided with one or more circular beads or ribs, projecting from said external wall.

BRIEF DESCRIPTION OF THE FIGURES

Other advantages and characteristics of the invention will become clearer in the description of a preferred embodiment below, with reference to the appended drawings, produced by way of non-limitative examples for guidance, wherein:

FIG. 1 is a diagram of an installation according to one embodiment of the invention, FIG. 2 is a diagram of a longitudinal section of a connector used in an installation according to the invention, FIG. 3 is a diagram of a transverse section of a connector used in an installation according to the invention, FIG. 4 illustrates a preferred embodiment of the fitting of the tube of the tubular body into the hole in the wall of the exchanger.

FIG. 5 is a top perspective view of a half-shell of a tubular body used in an installation according to the invention, FIG. 6 is a top perspective view of a half-shell of a tubular body used in an installation according to the invention, in one alternative embodiment, FIG. 7 is a perspective view from below of the half-shell of FIG. 5, FIG. 8 is a perspective view of an inlet or discharge area of a heat exchanger, FIG. 9 is an enlarged view of detail D of FIG. 10, FIG. 10 is an exploded perspective view of the body of a connector installed around a cooling fluid supply or discharge pipe, a seal and an inlet or discharge area of a heat exchanger, FIG. 11 shows the elements of FIG. 10 with the seal fitted onto the tube of the tubular body, FIG. 12 shows the connector of FIG. 11 connected to the inlet or discharge area of the heat exchanger, FIG. 13 illustrates steps of a method for mounting an installation according to the invention.

DETAILED DESCRIPTION OF THE EMBODIMENTS

For the sake of clarity, it is specified that the terms "tubular" and "tube" are to be understood for the purposes of this invention as covering cylindrical hollow parts with a cross section (or base line curve) is preferably circular, but which may also have a cross section of another shape such as an ellipse, square, rectangle, etc.

Again for the sake of clarity, the term "proximal portion" means the portion of the tube which is closest to the exchanger (or furthest from the pipe), and the term "distal portion" means the portion of the tube which is the furthest from the exchanger (or closest to the pipe).

"Elastic fitting" is to be understood in a non-limitative manner to include snap-on fastening or clipping on and generally covers any mode of assembly where elements are deformed during insertion. After assembly, the elements can no longer be separated inadvertently. However, there may be play between the elements after assembly.

As used herein, unless otherwise specified, the use of the ordinal adjectives "first", "second", etc., to describe an object merely indicates that different occurrences of similar objects are mentioned, and does not imply that the objects so described must be in a given sequence, whether in time, space, ranking or otherwise.

In FIG. 1, the installation comprises a first hybrid solar panel $P_1$ and a second hybrid solar panel $P_2$ placed one next to the other. The installation may of course have more panels (for example up to a hundred) or a single panel. These panels are for example of the type described in patent documents WO 2012/069750 and WO 2016/156764 to which those skilled in the art can refer if necessary. The electrical and thermal energy generated by them may be used by a home or an installation, for example to heat a swimming pool.

Each panel $P_1$, $P_2$ comprises a photovoltaic module $1_1$, $1_2$ having a front surface and a rear surface. The front surface is left free so that it can receive sunlight. Each photovoltaic module $1_1$, $1_2$ comprises at least one, and advantageously several photovoltaic elements $10_1$, $10_2$ placed in the same plane. These photovoltaic elements are electrically connected to each other in series or in parallel, and are preferably encapsulated, for example in thermoplastic polymer such as ethylene vinyl acetate (EVA) or silicone. The front surface of the photovoltaic module exposed to sunlight is advantageously covered with a transparent plate, for example a glass plate, to protect the photovoltaic elements $10_1$, $10_2$.

In FIGS. 2 and 3, a heat exchanger $2_1$, $2_2$, in which a cooling fluid flows, is placed opposite the rear surface of each photovoltaic module $1_1$, $1_2$ to recover the heat accumulated or dissipated in said module. With reference to FIG. 1, each exchanger $2_1$, $2_2$ has three main areas: an inlet area $ZA_1$, $ZA_2$ of the cooling fluid, a heat exchange area $ZE_1$, $ZE_2$ located under the photovoltaic elements $10_1$, $10_2$ and an outlet area $ZV_1$, $ZV_2$ of said fluid. The photovoltaic module $1_1$, $1_2$ may also be located at least partially above the inlet areas $ZA_1$, $ZA_2$ and/or outlet areas $ZV_1$, $ZV_2$. The exchange area $ZE_1$, $ZE_2$ may for example represent from 10% to 100% of the surface of the photovoltaic module $1_1$, $1_2$.

In the installation of FIG. 1, one and the same continuous pipe $T_A$ supplies cooling fluid to the heat exchanger $2_1$ of the first panel $P_1$ and the heat exchanger $22$ of the second panel $P_2$. And one and the same pipe $T_D$ discharges the cooling fluid from the heat exchanger $2_1$ of the first panel $P_1$ and from the heat exchanger $2_2$ of the second panel $P_2$.

More particularly, a first inlet connector $3_1$ makes it possible to connect the supply pipe $T_A$ to the inlet area $ZA_1$ of the first exchanger $2_1$; a second inlet connector $3_2$ makes it possible to connect the supply pipe $T_A$ to the inlet area $ZA_2$ of the second exchanger $2_2$; a first outlet connector $4_1$ makes it possible to connect the discharge pipe $T_D$ to the outlet area $ZV_1$ of the first exchanger $2_1$; and a second outlet connector $4_2$ makes it possible to connect the discharge pipe $T_D$ to the outlet area $ZV_2$ of the second exchanger $2_2$.

In FIG. 1, one end 420 of the supply pipe $T_A$ is closed in a manner sealed to fluids, for instance by means of a plug 4200. Miscellaneous accessories (not illustrated), such as air vents, temperature sensors or energy meters may be connected to the pipe $T_A$, upstream from the plug 4200. The other end 410 of the pipe $T_A$ is connected to a cooling fluid supply device 4100, for instance a pump. Similarly, one end 430 of the discharge pipe $T_D$ is closed in a manner sealed to fluids by means of a plug 4300. The other end 450 of the discharge pipe $T_D$ is connected to a cooling fluid collection device 4500, par example a domestic water heater, a heat exchanger of a home or a pool etc.

The panels $P_1$, $P_2$ are thus connected in parallel. The cooling fluid is sent under pressure in the common supply pipe $T_A$, for example between 0.5 bar and 3 bar. The fluid enters each of the heat exchangers $2_1$, $2_2$ through the connectors $3_1$, $3_2$ then circulates in each of said exchangers, between the inlet areas $ZA_1$, $ZA_2$ and the outlet areas $ZV_1$, $ZV_2$. The calorie-charged fluid comes out of the exchangers via connectors $4_1$, $4_2$ and is collected in the common discharge pipe $T_D$.

The supply pipe $T_A$ and the discharge pipe $T_D$ can be rigid, for example made of PVC (polyvinyl chloride), PP (polypropylene), etc. They are however preferably flexible, so that they can be easily rolled up and unrolled. The adjective "flexible" must be understood in the sense that the pipes can be bent or bowed by hand, without special tools. They may for example be made of stainless steel or textile braided EPDM (ethylene-propylene-diene monomer), in multiple layers, PE (polyethylene), silicone, rubber, with one or more layers of textile fabric embedded in the flexible thickness and/or with a stainless-steel braid and/or an anti-twist system consisting of looped fabric with helical reinforcement.

The use of a flexible pipe $T_A$, $T_D$ facilitates assembly insofar as it can be temporarily bent and/or bowed to connect the connectors $3_1$, $3_2$. In any event, once the installation is complete, the supply pipe $T_A$ and the discharge pipe $T_D$ may be straight, with no bend or with limited bends at the panels $P_1$, $P_2$, which strongly limits pressure losses.

In FIGS. 2 and 3, only the inlet connector $3_1$ is shown, with which the supply pipe $T_A$ is connected to the inlet area $ZA_1$ of the first exchanger $2_1$. The other connectors $3_2$, $4_1$ and $4_2$ are however made in the same way at the other inlet area $ZA_2$ and the outlet areas $ZV_1$, $ZV_2$.

The connector $3_1$ comprises a tubular body 30 fitted onto the pipe $T_4$. In FIGS. 2 and 3, this tubular body 30 takes the form of a cylindrical tube, the inner diameter of which corresponds substantially to the outer diameter of the pipe $T_4$, preferably slightly lower, for example by a few tenths of a millimetre, to facilitate the compression of seal 302. More generally, the tubular body 30 has the same cross section as the pipe $T_4$. By way of example, its thickness is between 1 mm and 3 cm and its length between 5 cm and 20 cm, preferably between 7 cm and 10 cm. The tubular body 30 is preferably made of rigid material such as polyvinyl chloride (PVC), PE, PP, PMMA (polymethyl methacrylate), polycarbonate, ABS (acrylonitrile butadiene styrene), PA (polyamide), PPS (polyphenylene sulphide), aluminium, steel, brass, copper, zinc, etc., or in more flexible material such as stainless steel or textile braided EPDM.

The tubular body 30 may be in a single piece. To simplify its assembly on the pipe $T_4$, the tubular body 30 is however preferably formed of two half-shells 30a and 30b assembled together. This solution avoids having to slide the tubular bodies 30 along the entire length of the pipe $T_4$ as is the case for single-piece tubular bodies.

The half-shells 30a, 30b may consist of two separate parts or be connected together at one of their edges by a hinge. Each half-shell 30a, 30b has an internal surface and an external surface. The internal surfaces envelop the external surface of the wall of the pipe $T_4$ when the two half-shells 30a, 30b are in the assembled state (FIGS. 10 and 12). The assembly is advantageously made by screwing, by means of screws which fit into dedicated recesses moulded on the external surfaces of the half-shells 30a, 30b. Other assembly techniques may be used, for example by gluing, welding or by means of blocking members, for example by clipping.

A tube 31 is attached to an external surface of the tubular body 30 from which it protrudes. The tube 31 and the external surface of the tubular body 30 form a single piece. This tube 31 provides fluid communication between the pipe $T_4$ and the exchanger $2_1$, more particularly with its inlet area $ZA_1$.

The tube 31 has a Z-Z axis which is normal to the longitudinal axis X-X of the body 30. The tube 31 is open at both ends. At its distal end, it opens into the internal space of the body 30. The distal end 311 of the tube 31 does not protrude from the internal wall of the body 30 unlike the solution described in patent document WO 2019/110884.

In the appended figures, this tube 31 is cylindrical and has a smooth external surface. By way of example, its outer diameter is between 10 mm and 20 mm, its inner diameter between 8 mm and 15 mm and its length between 10 mm and 40 mm. The tube 31 is made of rigid material, preferably the same material as the tubular body 30, although it may be made of different material. The upper end 311 of the tube 31 is advantageously bevelled to facilitate its insertion into the exchanger $2_1$ as explained later in the description.

In FIGS. 10 and 11, the heat exchanger $2_1$ has a wall 20 in which a hole 22 is made. The wall 20 is preferably the lower wall of the inlet area $ZA_1$, or, in other words, the bottom wall of said area. It is located opposite the body 30 when the latter is connected to the exchanger $2_1$. Its thickness is for example between 2 mm and 5 mm. The hole 22 is a through hole, that is to say it goes through the wall 20. Its centre line is perpendicular to the wall 20. It can be obtained by drilling the wall 20 or be shaped directly when the inlet area $ZA_1$ is moulded. The hole 22 has for example a diameter between 15 mm and 25 mm. As a single hole is made in the wall 20, the external surface of the latter may be perfectly flat, with no protruding element, unlike the solution described in patent document WO 2019/110884.

Referring to FIGS. 2 and 3, the tube 31 fits freely into the hole 22 when connecting the tubular body 30 to the exchanger $2_1$. "Freely" means that the tube 31 and/or the hole 22 are not intrinsically provided with fixing elements holding them in position. In other words, neither the tube 31 nor the hole 22 holds the tubular body 30 in position on the exchanger $2_1$. Such fitting is carried out in the direction of insertion Z-Z of the tube 31 in the hole 22. In this configuration, the upper end 311 of the tube 31 is located inside the area $ZA_1$, or, in any event, opens into said area.

To make the connection between the tube 31 and the hole 22 sealed to fluid, a seal 4 is installed around said tube. This seal 4 only has a sealing function and does not hold the tubular body 30 in position on the exchanger $2_1$. According to a preferred embodiment illustrated in FIGS. 4, 12 and 13, the seal 4 is in the form of a sleeve which fits onto the external wall of the tube 31. The length of the sleeve 4 corresponds substantially to that of the tube 31. Its inner diameter also corresponds to the outer diameter of the tube 31. The sleeve 4 is preferably made of elastomer, rubber, PTFE, PVC, or SEBS. The best results in terms of sealing and resistance to ageing are obtained by using a TPV (thermoplastic vulcanisate) sleeve.

The internal wall of the sleeve 4 is designed to fit the external wall of the tube 31 and has a cross section corresponding to the cross section of the latter. According to an advantageous characteristic of the invention, the sleeve 4 has a tapering external wall. This taper is exaggerated in FIG. 4; in practice, it represents an angle α comprised between 0.5° and 3°. The external wall is also provided with one or more circular beads or ribs 41, projecting from said external wall, for example by 1 mm to 3 mm.

The hole 22 has the same taper, and its internal wall is designed to fit the external wall of the sleeve 4. Thus, when the tube 21—equipped with the sleeve 4—fits into the hole 22, the beads or ribs 41 will tend to press against the internal wall of said hole so as to form a seal between said sleeve and said hole. Concomitantly, the sleeve 4 is tightened around the external wall of the tube 31, so that said sleeve is also sealed to said tube. This very simple sealing solution makes it possible to simplify the design of the connector $3_1$, reduce costs, and ensure very quick manual connection, without any tools. In addition, as a simple hole 22 is made in the wall 20, the external surface of the latter can be perfectly flat, without protruding element. It is thus possible to minimize the compactness of the areas $ZA_1$, $ZA_2$, $ZV_1$, $ZV_2$, in particular their height, and hence the compactness of the exchanger $2_1$, $2_2$, in comparison with the solution described in patent document WO 2019/110884.

Since the diameter of the hole 22 is greater than its height (height which corresponds to the thickness of the wall 20), the tube 31 is held laterally only over a short distance. The length of the assembly (common cylindrical part) of the tube 31 and of the hole 22 is therefore overall very small compared with the adjusted diameter. Such short centring leads to swivelling by the tube 21, which could adversely affect sealing. To solve that problem, the position locking function of the connector 31 is separated from the sealing function (provided by the assembly formed by the tube 31, the sleeve 4 and the hole 22).

By reference to FIGS. 3 and 10 to 12, the tubular body 30 is assembled on the heat exchanger $2_1$ by means of members 5, 25 configured to fit said body on said exchanger elastically. These members maintain the body 30 in position on the exchanger $2_1$ and are separate from the sleeve 4, the tube 31 and the hole 22. More particularly, the body 30 is provided with snap-on members 5 cooperating with complementary snap-on members 25 arranged on the heat exchanger $2_1$.

The snap-on members of the body 30 take the form of tabs 50 which extend, from the external surface of the body 30, parallel to the tube 31 (and parallel to the axis Z-Z) and on the same side as the latter. In FIG. 3, the spacing between two tabs 50 which face each other (that is to say arranged symmetrically with respect to the median plane of the body 30) corresponds to the width of the area $ZA_1$. Each tab 50 comprises an end integral with the body 30 and a free end provided with a snap-on element 51 which may be take the form of an inverted hook. That hook 51 comprises a contact surface inclined in the direction of insertion of the tube 31 into the hole 22 and a contact surface normal to the direction of exit of said tube.

The length of the tabs 50 corresponds substantially to that of the tube 31, that is to say between 10 mm and 40 mm for example. The tabs 50 are flexible to some extent, allowing them to be elastically deformed and/or to bend, at least locally, in particular so that their snap-on element 51 can reach the snapping-on holes 25 described later in the description. To allow such flexibility, the width and the thickness of the tabs 50 are for example between 2 mm and 5 mm.

Along with the external surface of the body 30, the snap-on members 5 form a single-piece part and, to simplify the design and reduce manufacturing costs, they are preferably obtained when said body is moulded. The applicant has found that two snap-on members 5 were sufficient, but a higher number can be envisaged (for example 4, 6, or 8). In the appended figures, two pairs of snap-on members 5 are shown in particular, installed on each side of the body 30.

The snap-on members 5 cooperate with snapping-on holes 25 provided on the exchanger $2_1$. In FIGS. 3, 9, and 10 to 12, these snapping-on holes 25 are made in the side walls 23 of the area $ZA_1$. Thus, when the tube 31 begins to be inserted into the hole 22, the inclined contact surface of each hook 51 slides on the external surface of the wall 23, so that the tabs 50 move apart automatically, pivoting in a direction opposite to said tube, around their fixed end. When the hooks 51 reach the snapping-on holes 25 (in practice when the tube 31 is correctly inserted into the hole 22), said hooks, by a spring effect of the tabs 50, lock automatically in said snapping-on holes. The normal contact surface of the hooks 51 blocks their exit from the snapping-on holes 25, so that the tube 31 cannot exit from the hole 22. The removal of the tube 31 along the axis Z-Z is blocked. The coaxiality of the tube 31 and the hole 22 is thus ensured, which guarantees optimum supply (or discharge) of the cooling fluid into (or out of) the heat exchanger $2_1$, particularly when the fluid is under pressure.

In FIG. 5, the body 30 is provided with two pairs of tabs 50. The tabs 50 of each pair are arranged in a mirror configuration, symmetrical in relation to the median plane of the body 30 (plane including axes X-X and Z-Z). In this embodiment, the body 30 and the pipe $T_A$ are oriented in the direction of the length of the area $ZA_1$, that is to say in the width of the panel $P_1$ (as in FIG. 1). This embodiment is suitable when the panels are arranged in a "portrait" orientation, where the pipes $T_A$, $T_D$ remain horizontal.

In the alternative embodiment of FIG. 6, the tabs 50 of each pair are arranged in a mirror configuration, symmetrical in relation to the secant plane of the body 30 (plane including axes Y-Y and Z-Z). In this embodiment, the body 30 and the pipe $T_A$ are oriented in the direction of the width of the area $ZA_1$, that is to say in the length of the panel $P_1$. This embodiment is suitable when the panels are arranged in a "landscape" orientation, where the pipes $T_A$, $T_D$ remain in a horizontal position, in this case as well.

The main function of the snap-on members 5 is to block the tube 31 axially in the hole 22. It is however necessary to also block transverse movements (along the axes X-X and Y-Y) and rotation (around the axes X-X, Y-Y and Z-Z) of the body 30 with respect to the heat exchanger $2_1$, so that the connector 31 remains rigidly attached to said exchanger, to avoid tipping over or tearing off when the panel $P_1$ is installed or handled and/or when the cooling fluid is pressurised.

One solution would be to oversize the snap-on members 5 so that all the forces and/or stresses are taken up by said members. One could for example provide for wider tabs 50 and hooks 51. The main drawback of this solution is that more force is needed to fit the connector 31 into the heat exchanger $2_1$. Assembly would therefore be much more difficult.

According to one characteristic of the invention, preference is given to maintaining the flexibility of the snap-on members 5 (to retain easy and rapid assembly, and therefore to keep tabs 50 relatively thin) and to distributing the mechanical stresses and/or forces generated by transverse movements and/or rotations of the body 30 relative to the heat exchanger $2_1$ among other elements.

With particular reference to FIGS. 2, 5 and 6, one or more lugs 6 are arranged on the tubular body 30. These lugs 6 are separate from the snap-on members 5 and protrude from the external surface of the body 30 and are arranged close to the tube 31 (for example approximately 5 mm from its external wall). In the appended figures, four lugs 6 are shown, arranged symmetrically with respect to the median plane of the body 30. A smaller or larger number of lugs 6 can however be envisaged. Their dimensions are relatively small. By way of example, their height, width and thickness are between 3 mm and 5 mm.

The lugs 6 fit inside additional recesses 26 provided on the exchanger $2_1$. In FIGS. 2 and 11, these recesses 26 are made in the bottom wall 20 of the area $ZA_1$ and/or at the intersection of said bottom wall and the side walls 23. They are arranged so that when the tube 31 is inserted into the hole 22, the lugs 6 fit into the recesses 26. In this position illustrated in FIG. 14, the lugs 6 mainly block transverse movements: along the X-X axis (according to the configuration in FIG. 5) or along the Y-Y axis (according to the configuration in FIG. 6); and rotation around the Z-Z axis and the XX axis (according to the configuration in FIG. 5) or the Y-Y axis (according to the configuration in FIG. 6) of the body 30 with respect to the heat exchanger $2_1$. Thanks to such cooperation, the robustness of the connector $3_1$ is improved and it is better held against area $ZA_1$.

To further improve the robustness and holding in position of the connector 31, one or more other locking elements 7 are advantageously provided on the body 31. In FIG. 5, these elements 7 take the form of ribs oriented along the Y-Y axis of the body 30. These ribs 7 are separate from the lugs 6 and the snap-on members 5 and protrude from the external surface of the body 30. They are arranged on either side of the tube 31. In FIG. 5, they are arranged symmetrically relative to the secant plane of the body 30 and in FIG. 6, symmetrically relative to the median plane of said body. By way of example, the length of the ribs 7 is between 15 mm and 50 mm and their height between 5 mm and 40 mm and their thickness between 3 mm and 5 mm. In FIGS. 5 and 7, two ribs 7 are shown, but a larger or smaller number may be envisaged.

The ribs 7 fit into additional recesses 27 provided on the exchanger $2_1$. In FIG. $1_1$, these recesses 27 are made in the bottom wall 20 of area $ZA_1$. They are arranged so that when the tube 31 is inserted into the hole 22, the ribs fit into the recesses 27. In this position illustrated in FIG. 12, the ribs 7 mainly block transverse movements: along the Y-Y axis (according to the configuration in FIG. 5) or along the X-X axis (according to the configuration in FIG. 6); and rotation around the Z-Z axis and the Y-Y axis (according to the configuration in FIG. 5) or the X-X axis (according to the configuration in FIG. 6) of the body 30 with respect to the heat exchanger $2_1$.

For each rib 7, a series of several parallel recesses 27 (for example two recesses) may be provided as illustrated in FIG. 9. Indeed, depending on the connector models, the ribs 7 may be more or less spaced apart from each other. The series of recesses makes it possible to accommodate the ribs regardless of the spacing.

In FIGS. 9 to 19, each snapping-on hole 25 is arranged in a channel 250 made in the side wall 23 of the area $ZA_1$. These channels substantially have the same width as the tabs 50, so that said tabs can slide in them. When inserting the tube 31 into the hole 22, the tabs 50 and the hooks 51 are then guided in the channels 250. And after the hooks 51 are locked in the snapping-on holes 25, the tabs 50 are located in the channels 250 so that they block the transverse movements of the body 30 along the axis X-X (in the configuration of FIG. 5) or along the Y-Y axis (in the configuration of FIG. 5). This design detail helps further improve the holding in position of the connector $3_1$ against area $ZA_1$.

In the appended figures, the body 30 comprises snap-on members 5, tabs 6 and ribs 7. The body 30 may however have only snap-on members 5. According to one embodiment, the body 30 comprises snap-on members 5 and lugs 6, but no ribs 7. According to another embodiment, the body 30 comprises snap-on members 5 and ribs 7, but no lugs 6. According to yet another embodiment not covered by the claims, the body 30 comprises lugs 6 and ribs 7 but no snap-on members 5.

In FIG. 2, a sealing element 302 provides fluid sealing between the internal surface of the body 30 and the external surface of the wall of the pipe $T_A$. By reference to FIG. 7, this sealing element 302 is located around the distal end 310 of the tube 31 which opens into the body 30. To simplify the design and reduce costs, this sealing element 302 advantageously takes the form of an O-ring installed in an arrangement 301 made on the internal surface of the body 30, around the distal end 310. This O-ring is installed in the body 30, prior to the insertion of the pipe $T_A$. Other techniques may however be used for sealing, in particular techniques involving welding or gluing the tubular body 30 to the external surface of the pipe $T_A$.

Unlike the solution described in patent document WO 2019/110884, the distal end 311 of the tube 31 does not protrude from the internal wall of the body 30 and does not engage with the wall of the pipe $T_A$. The tube 31 therefore does not contribute to holding the pipe in position in the body 30. By reference to FIG. 7, such holding in position is ensured by claws 33 (or pins) provided on the internal wall of the body 30. By way of example, these claws 33 are 1 mm to 2 mm high, 1 mm to 3 mm wide, and 0.5 to 2 mm thick. Their number may vary from 5 to 30. When the pipe $T_A$ is inserted into the body 30, the claws 33 act against the external surface of the wall of said pipe and generate static friction which opposes the relative movement of said body and of said pipe.

Steps of the method of mounting an installation according to the invention will now be described with reference to FIG. 13.

When they are in one piece, the tubular bodies 30 are fitted onto the pipe $T_A$, by sliding them axially (along the axis X-X) along said pipe. When they are formed of half-shells 30a and 30b, they are more simply put in place on the pipe $T_A$ by installing these half-shells around the pipe and securing them together. The tubular bodies 30 are spaced apart from each other, preferably at regular intervals, for example between 50 cm and 10 m. In practice, that interval depends on the distance between panels.

When the tubular bodies 30 are correctly installed around the pipe $T_A$, a series of radial holes 400 are made in said pipe. Each hole 400 is made through the tube 31 of the body 30. In practice, the holes 400 are made by means of a tool O of the drill type which passes through the tube 31, which tube acts as a guide. Thus, each hole 400 is perfectly coaxial with the axis Z-Z of the tube 31. The diameter of the holes 400 corresponds to the inner diameter of the tubes 31. The same method is applied to the $T_D$ discharge pipe.

A pipe $T_A$, $T_D$ can thus be made that is several meters long, for example 50 m, on which are installed several tubular bodies 30, for example 49 bodies spaced apart by 1 m each. When the $T_A$, $T_D$ hose is flexible, it can be rolled up into a reel, and therefore easily stored without taking up space. If the installation includes two side-by-side panels, the installer can cut a 2 m portion to form the supply pipe $T_A$ and cut another 2 m portion to form the discharge pipe $T_D$. If the installation includes 10 side-by-side panels, the installer can cut two 10 m portions to form the pipes $T_A$, $T_D$. The rest of the pipe will be kept aside for subsequent use in another installation.

The diameter of the pipes $T_A$, $T_D$ may be larger than that of the tubes 31 so as to be able to support a higher flow rate. For example, if the flow rate of fluid circulating in each of the two panels $P_1$, $P_2$ is 5 $m^3/h$, the flow rate of fluid circulating in each of the pipes $T_A$, $T_D$ could be 10 $m^3/h$, with a sufficiently large inner diameter to limit pressure losses in said pipe which can be difficult to support for a pump. The invention finally makes it possible to obtain connectors $3_1$, $3_2$, $4_1$, $4_2$ in a size relatively small compared to the diameter of the pipes $T_A$, $T_D$, so that the latter can be located as close as possible to the frames 9 of the panels $P_1$, $P_2$, as shown in FIGS. 2 and 3. This configuration is particularly advantageous because in roof boarding photovoltaic installations, the distance between the panels $P_1$, $P_2$ and their substrate (for example a roof) is generally small. In other words, these connectors $3_1$, $3_2$, $4_1$, $4_2$ make it possible to accommodate pipes $T_A$, $T_D$ of a large diameter, capable of supporting high flow rates, in a panel/substrate space which is narrow. In FIGS. 2 and 3, it can besides be seen that the lower edge 90 of the frame 9 is flush with the lower wall 20 of the area $ZA_1$, which wall defines the maximum height of the panel $P_1$. Thanks to the constructive solutions of the invention, no element protrudes from the external surface of this wall 20. It is thus possible to reduce the size of the panel $P_1$, in particular its height, so as to use frames 9 with height below 45 mm, preferably less than or equal to 30 mm.

The arrangement of the various elements and/or means and/or steps of the invention, in the preferred embodiments described above, must not be understood as requiring such an arrangement in all implementations. In particular:

The sealing sleeve 4 may be substituted by one or more: O-rings, lobe seals, lip seals, lamellar seals, etc.

The connectors $3_1, 3_2, 4_1, 4_2$ are not necessarily fixed on one of the inlet areas $ZA_1, ZA_2$ and/or outlet areas $ZV_1, ZV_2$ of the exchanger. If the latter has another configuration, for example has no inlet and/or outlet area, or if these areas have other shapes, the connectors $3_1, 3_2, 4_1, 4_2$ can be connected to another wall of said exchanger.

The positioning and shape of the snap-on members 5, the lugs 6 and the ribs 7 are not limited to those shown in the appended figures. The same applies to the snapping-on holes 25 and the recesses 26 and 27. These elements may in particular be arranged on other walls of the exchanger $2_1$.

Further, one or more characteristics disclosed only in one embodiment may be combined with one or more other characteristics disclosed only in another embodiment. Similarly, one or more characteristics disclosed only in one embodiment may be generalised to the other embodiments, even if the characteristic or characteristics are described only in combination with other features.

The invention claimed is:

1. An installation comprising:
   a pipe supplying or discharging a cooling fluid,
   at least one hybrid solar panel, wherein said panel comprises:
   a photovoltaic module,
   a heat exchanger in which a cooling fluid flows,
   a connector connecting the heat exchanger to the pipe, wherein said connector comprises:
   a tubular body installed around the pipe,
   a tube installed on an external wall of the tubular body, which allows fluid communication between the pipe and the heat exchanger, which tube and which external wall form a single piece, wherein:
   the heat exchanger has a wall in which a hole is made, wherein the tube fits freely in said hole, wherein said hole is devoid of fasteners that hold them in position,
   the tube has a seal that makes the connection between said tube and hole sealed to fluids,
   the seal takes the form of a sleeve that fits onto the external wall of the tube, and
   the tubular body is assembled on the heat exchanger by members configured to elastically fit said body on said exchanger, which members are separate from the sleeve, the tube and the hole, and which hold said body in place on said exchanger.

2. An installation according to claim 1, wherein claws or pins are arranged on the internal wall of the tubular body.

3. An installation according to claim 1, wherein:
   the sleeve has a tapered external wall,
   the hole has the same taper as the sleeve, wherein the internal wall of said hole is designed to fit the external wall of said sleeve.

4. An installation according to claim 3, wherein the external wall of the sleeve has one or more circular beads or ribs projecting from the said external wall.

5. An installation according to claim 1, in which one or more ribs are arranged on the tubular body, which ribs fit into complementary recesses arranged on the exchanger, which ribs are separate from the snap-on members.

6. An installation according to claim 5, wherein the ribs are arranged symmetrically with respect to the secant plane of the tubular body.

7. An installation according to claim 5, wherein the ribs are arranged symmetrically with respect to the median plane of the tubular body.

8. An installation according to claim 1, wherein elastic fitting is carried out by snap-on members provided on the tubular body, which snap-on members cooperate with complementary snap-on members provided on the heat exchanger.

9. An installation according to claim 8, wherein:
   the snap-on members of the tubular body take the form of flexible tabs which extend, from the external surface of said body, parallel to the tube and on the same side as said tube,
   each tab comprises an end integral with the tubular body and a free end provided with a snap-on element,
   each snap-on element cooperates with a snapping-on hole provided on the heat exchanger.

10. An installation according to claim 9, wherein each snapping-on hole is made in a channel made in a wall of the heat exchanger, which channels form guides for the tabs (when the tubular body is fitted on the wall of said exchanger.

11. An installation according to claim 9, wherein the tubular body has two pairs of tabs, wherein the tabs of each pair are arranged in a mirror configuration, symmetrical in relation to the median plane of said body.

12. An installation according to claim 11, wherein each snapping-on hole is made in a channel made in a wall of the heat exchanger, which channels form guides for the tabs when the tubular body is fitted on the wall of said exchanger.

13. An installation according to claim 9, wherein the tubular body has two pairs of tabs, wherein the tabs of each pair are arranged in a mirror configuration, symmetrical in relation to the secant plane of said body.

14. An installation according to claim 13, in which one or more lugs are arranged on the tubular body, which lugs fit into complementary recesses arranged on the exchanger, which lugs are separate from the snap-on members.

15. An installation according to claim 13, wherein each snapping-on hole is made in a channel made in a wall of the heat exchanger, which channels form guides for the tabs when the tubular body is fitted on the wall of said exchanger.

* * * * *